(12) United States Patent
Sawada et al.

(10) Patent No.: US 8,537,106 B2
(45) Date of Patent: Sep. 17, 2013

(54) OPERATION PANEL STRUCTURE

(75) Inventors: Kenji Sawada, Toyokawa (JP); Akihiro Nishida, Shinshiro (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 894 days.

(21) Appl. No.: 11/830,052

(22) Filed: Jul. 30, 2007

(65) Prior Publication Data

US 2008/0122795 A1    May 29, 2008

(30) Foreign Application Priority Data

Nov. 28, 2006    (JP) .................................. 2006-319519

(51) Int. Cl.
*G09G 5/00*    (2006.01)

(52) U.S. Cl.
USPC ........................................................ 345/156

(58) Field of Classification Search
USPC ................. 345/157, 173; 361/681, 683, 686; 358/1.15
See application file for complete search history.

(56) References Cited

U.S. PATENT DOCUMENTS

| | | | | |
|---|---|---|---|---|
| 3,928,846 A | * | 12/1975 | Arai et al. ...................... | 340/317 |
| 5,751,548 A | * | 5/1998 | Hall et al. ................. | 361/679.41 |
| 5,992,809 A | * | 11/1999 | Sweere et al. .............. | 248/278.1 |
| 2004/0145870 A1 | * | 7/2004 | Minami et al. ................ | 361/724 |

FOREIGN PATENT DOCUMENTS

| | | |
|---|---|---|
| JP | 11-119498 A | 4/1999 |
| JP | 2000-122362 | 4/2000 |
| JP | 2003-246114 | 9/2003 |
| JP | 2004-032280 A | 1/2004 |
| JP | 2005-017690 A | 1/2005 |

OTHER PUBLICATIONS

A Notification of Reasons for Refusal issued in corresponding Japanese Patent application No. 2006-319519, and English translation thereof.

* cited by examiner

*Primary Examiner* — Yong H Sim
(74) *Attorney, Agent, or Firm* — Buchanan Ingersoll & Rooney PC

(57) ABSTRACT

An operation panel structure for an image forming apparatus, said operation panel structure having an operation panel protruding from a front side of the image forming apparatus. The operation panel structure has a first support unit for supporting the operation panel such that the operation panel is capable of pivoting in a first direction along a vertical direction and a second support unit for supporting the operation panel such that the operation panel is capable of pivoting in a second direction along a horizontal direction. A lock claw is capable of selectively engaging with a plural number of lock holes so that the operation panel can be locked in the plural number of locked positions while the operation panel is pivoting in the first direction.

30 Claims, 14 Drawing Sheets

F I G. 4
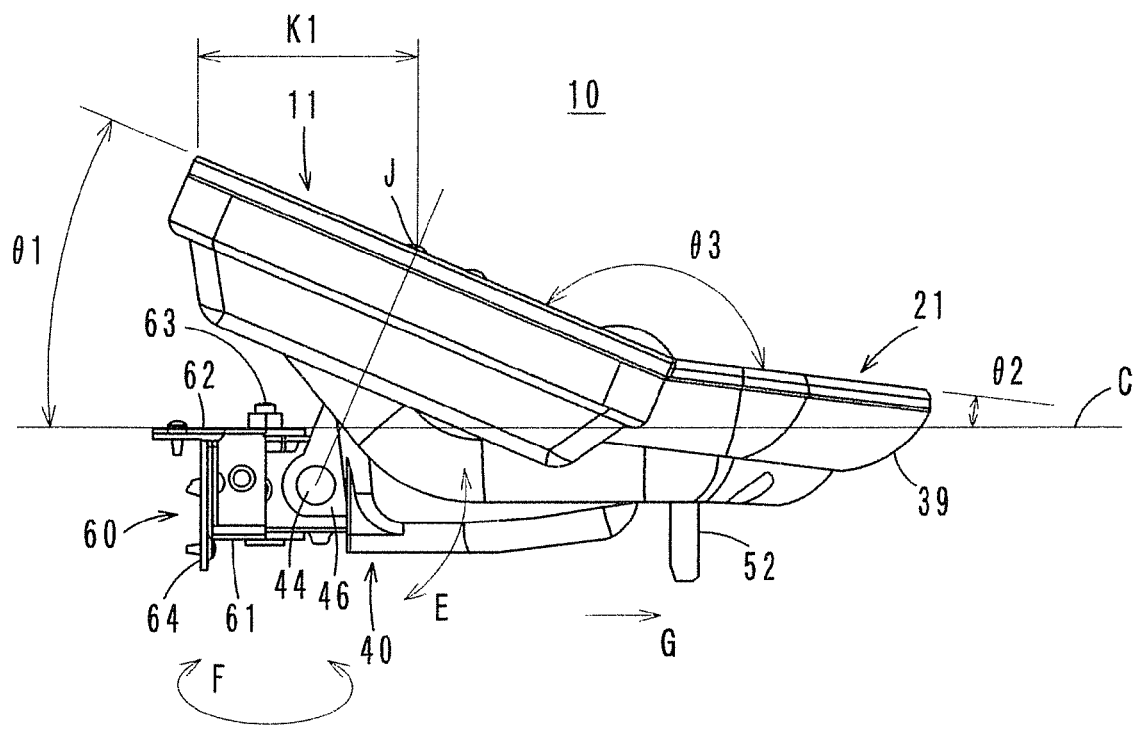

F I G. 1 5 a
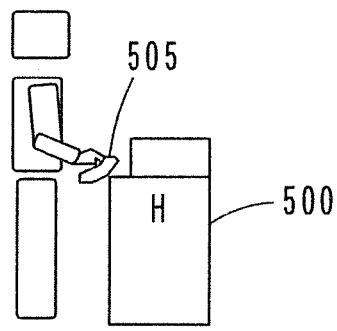
F I G. 1 5 c
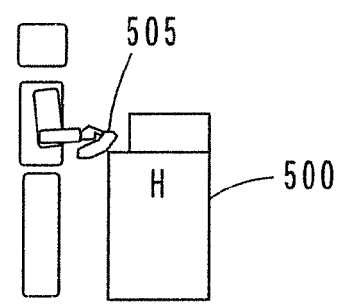
F I G. 1 5 b
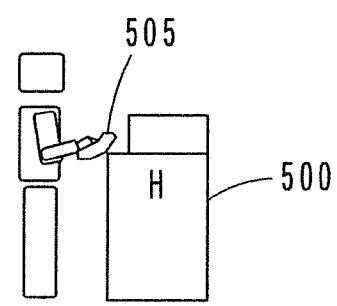
F I G. 1 5 d
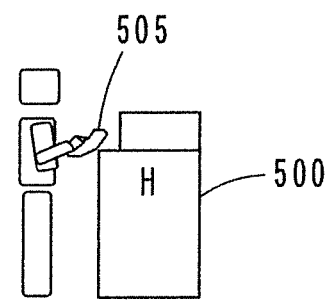
F I G. 1 5 e
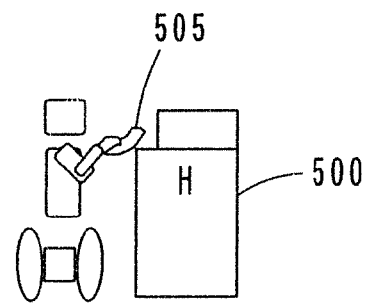

OPERATION PANEL STRUCTURE

This application is based on Japanese patent application No. 2006-319519 filed on Nov. 28, 2006, of which content is herewith incorporated by reference.

BACKGROUND OF THE INVENTION

1. Field of the Invention

The present invention relates to an operation panel structure, and more particularly to an operation panel structure which is provided for an image data input/output device of a scanner or an image forming apparatus for forming an image on a paper by an electrophotographic method.

2. Description of Related Art

In recent years, in various kinds of arts, a concept of universal design of industrial products for the convenience of physically handicapped people as well as ordinary people draws attention. In the art of image data input apparatus, such as scanners, and image forming apparatus, such as copying machines and printers, especially operation panels which has an input section which is to input the details of processing of image data and a display section which is to display the details input and the working state of the apparatus are demanded to be universal-designed.

For example, FIGS. 15a-15e show the positions of operators in relative to a copying machine 500 provided with a fixed type operation panel 505. The operation panel 505 sticks forward out of the copying machine 500. FIG. 15a shows a state where a Western man of average height is operating the machine, and FIG. 15b shows a state where a Western woman of average height is operating the machine. FIG. 15c shows a state where a Japanese man of average height is operating the machine, and FIG. 15d shows a state where a Japanese woman of average height is operating the machine. FIG. 15e shows a state where a handicapped person in a wheel chair is operating the machine.

As is apparent from FIGS. 15a-15e, with the fixed type operation panel 505, the bending angle of the operator's arm depends on his/her height and his/her physical characteristics, and for some people, it is inconvenient to operate the machine 500 with the fixed type operation panel 505. A printed paper is ejected horizontally on a section H of the copying machine 500, and the operator must bend forward to take the printed paper out of the section H. At this time, however, the operator may hit his/her body against the operation panel 505. When a large-sized document is to be copied, the part of the document sticking out of a platen glass must be prevented from interfering with the operation panel 505. Also, a countermeasure is necessary to ease the impact on the operator's body when the operator hits his/her body against the operation panel 505.

Especially for operators who usually make a large number of printed sheets, if the height and/or the angle of the operation panel 505 do not match their bodies, they will have fatigue on their eyes and/or on their legs. Needless to say, for physically handicapped people, mismatching between their bodies and the operation panel 505 will be a bigger burden on them.

Japanese Patent Laid-Open Publications No. 2004-32280, No. 11-119498 and No. 2005-17690 have disclosed universal-designed operation panels for copying machines. These universal-designed operation panels are structured to pivot up and down and to be locked at desired angles.

However, these existing operation panels do not satisfactorily comply with the demand for universal design, which is a demand for operation panels which are easy to use and easy to see for any person of any height and even a person in a wheelchair. If a spherical universal joint is used to enable an operation panel to pivot in every direction, operators are, instinctively as human beings, apt to make minor adjustments many times before determining the position of the operation panel, which, on the contrary, may deteriorate the operability of the operation panel. When the operation panel is structured to pivot in the vertical direction, the supporting structure of the operation panel may be rickety and/or loose. The reason is that during key operation, pressure of the operator's finger on the keys acts in the gravitational direction. Especially regarding a clear key, operators usually push the clear key suddenly, and at that time, a strong pressure acts in the gravitational direction. Also, compared with pivoting the operation panel in the vertical direction, pivoting the operation panel in the horizontal direction is difficult for human beings, and any help is necessary for a smooth pivot of the operation panel in the horizontal direction.

SUMMARY OF THE INVENTION

An object of the present invention is to provide an operation panel structure for an image data input/output device which is convenient enough to comply with a demand for universal design.

In order to attain the object, the present invention provides an operation panel structure for an image data input/output apparatus, comprising an operation panel, with an operation section protruding from a front side of a body of the image data input/output apparatus, said operation panel structure comprising: a first support unit for supporting the operation panel such that the operation panel is capable of pivoting in a first direction along a vertical direction; a second support unit for supporting the operation panel such that the operation panel is capable of pivoting in a second direction along a horizontal direction; a lock system for permitting the operation panel to be held in a plural number of locked positions while the operation panel is pivoting in the first direction; and a brake member for applying a resistance to a pivot of the operation panel in the second direction.

BRIEF DESCRIPTION OF THE DRAWINGS

This and other objects and features of the present invention will be apparent from the following description with reference to the accompanying drawings, in which:

FIG. 4 is a side view of the operation panel;

FIGS. 15a-15e are illustrations showing accesses of operators to an operation panel.

DETAILED DESCRIPTION OF THE PREFERRED EMBODIMENTS

Embodiments of an operation panel structure according to the present invention are described with reference to the accompanying drawings.

General Structure of Copying Machine; See FIG. 1

Figure 1:
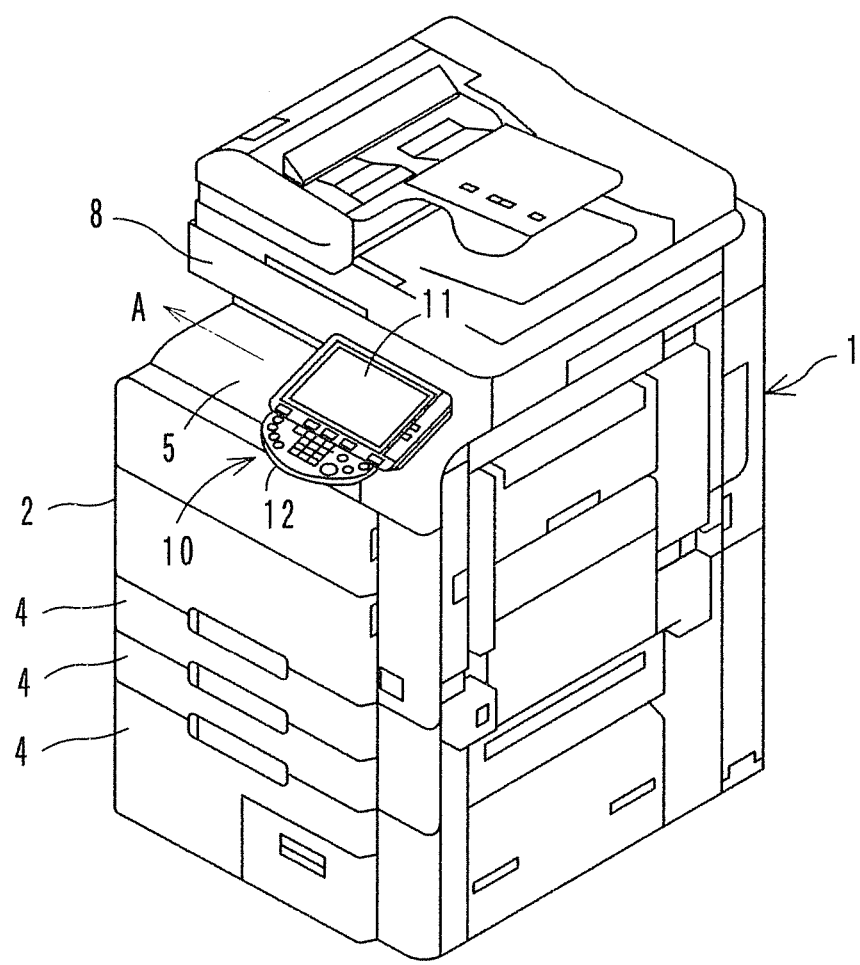
FIG. 1 is a perspective view of a copying machine provided with an operation panel structure according to the present invention.

FIG. 1 shows a case where an operation panel structure according to the present invention is applied to a copying machine 1. The copying machine 1 forms images on paper sheets by a conventional electrophotographic method. The copying machine 1 has an image reading unit 8 in an upper section. Images read by the image reading unit 8 are reproduced on paper sheets by an image forming unit installed in a body 2. Paper sheets are stacked in a feed cassette 4 provided in a lower section and are fed out one by one, and printed sheets through conventional image forming processes are ejected in a direction "A" to an ejection section 5.

An operation panel 10 is provided for the copying machine 1. The operation panel 10 is located on a front side of the copying machine 1 in a posture to protrude forward, in the right side which is an upstream side of the ejection section 5 in the sheet ejecting direction "A".

Operation Panel; See FIGS. 2-5

As FIGS. 2-5 show, the operation panel 10 comprises a first section 11 which functions mainly as a display and a second section 21 which functions mainly as an input device having a ten-key 22, etc. The first section 11 and the second section 12 are integrated together such that respective operation faces of these sections 11 and 12 are orthogonal to the width direction (direction "B") of the copying machine body 2 and are at mutually different angles to the horizontal plane C. Specifically, as FIG. 4 shows, the operation face of the first section 11 is set at an angle θ1 within a range from 20 degrees to 25 degrees to the horizontal plane C, and the operation face of the second section 21 is set at an angle θ2 within a range from 5 degrees to 10 degrees to the horizontal plane C. The operation faces of the first section 11 and the second section 21 are at an angle θ3 within a range from 160 degrees to 170 degrees to each other.

The second section 21 is located in front of the first section 11. The first section 11 is rectangular in a plan view, and the second section 21 is substantially semicircular in a plan view. The interconnection between the front edge of the first section 11 and the rear edge of the second section 21 has a step 20 (see FIG. 5), and the first section 11 rises more upward from the horizontal plane C than the second section 21. The first section 11 and the second section 21 have mutually different widths, and the width of the first section 11 is larger than the width of the second section 21.

On the operation face of the first section 11, a liquid crystal display 12 is provided. The liquid crystal display 12 incorporates a touch panel for setting of operation modes of the copying machine body 2 and the image reading unit 8, and thus, setting and display of the operation modes are performed with the liquid crystal display 12. On the operation face of the first section 11, by the right side of the liquid crystal display 12, a mode memory key 13 and a counter display key 14 are provided. Further, in front of the liquid crystal display 12, keys 15 which are seldom used (for example, a brightness setting key, a box memory key, a facsimile/scan switching key, a copy switching key, a reset key, etc.) are provided.

On the operation face of the second section 21, a ten-key 22, a print start key 23, a stop key 24, an interruption key 25, a test copy key 26 and a clear key 27 are provided. Additionally, a help key and so on 28 are provided along the left edge. On the round front edge of the second section 21, a lighting indicator 31 for indicating an unusual state of the copying machine body 2 and/or the image reading unit 8 is provided. The indicator 31 is lighting, for example, in green when the copying machine body 2 and the image reading unit 8 are operating normally, and the indicator 31 is turned, for example, into red when emptiness of sheets, emptiness of toner, occurrence of a paper jam or the like is detected. With the indication of an unusual state, an operator will confirm the information displayed on the liquid crystal display 12 of the first section 11, so that the operator will know the details of the unusual state.

Figure 5:
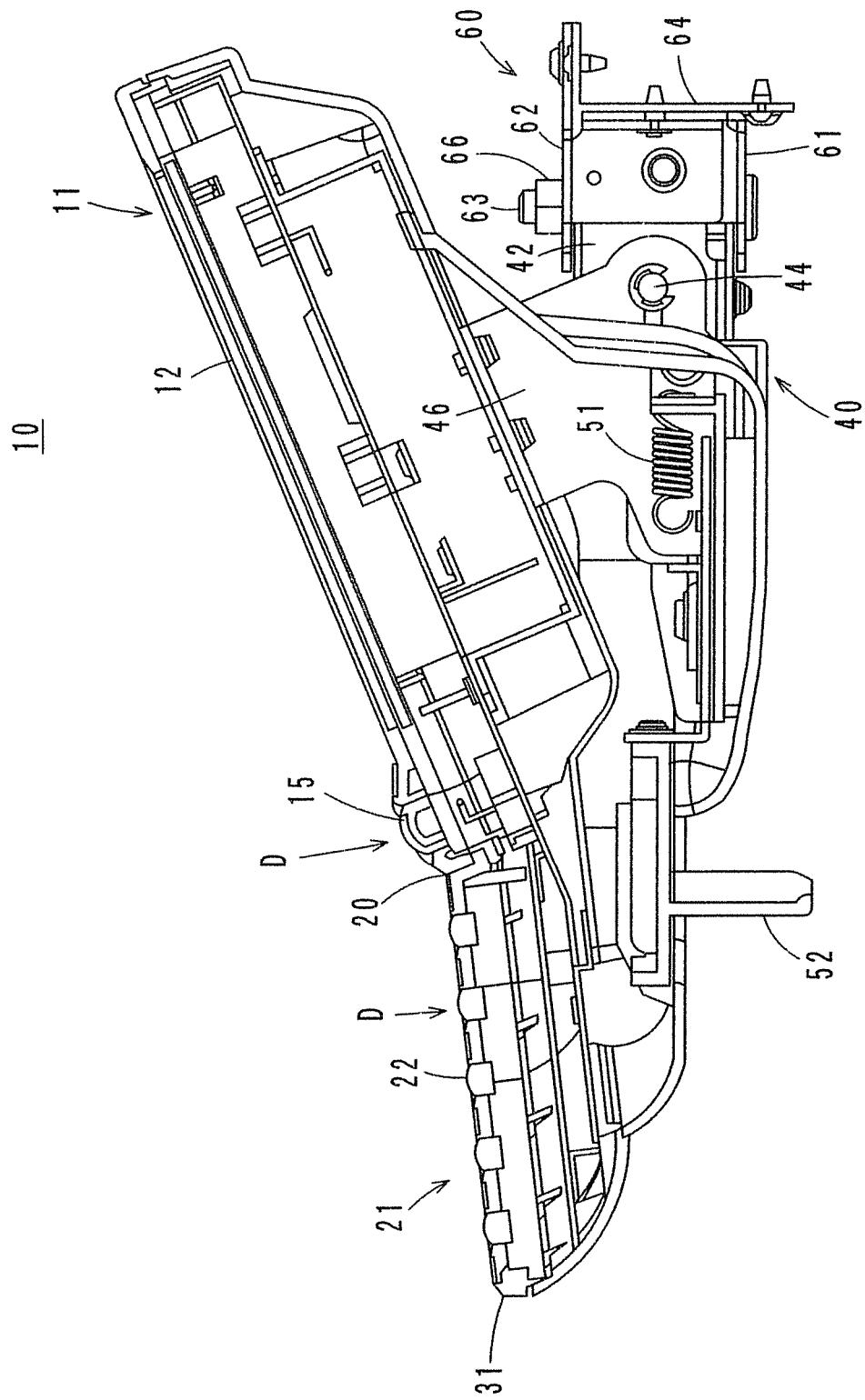
FIG. 5 is an enlarged sectional view of the operation panel.

As shown by FIG. 5, which is a sectional view of the operation panel 10, the ten-key 22 and the other keys provided on the operation face of the second section 21 are to be pushed in a direction "D". Each of the seldom-used keys 15 which are provided on the operation face of the first section 11 has a round upper portion and protrudes slightly more than the ten-key 22. The keys 15 are pushed in substantially the same direction as the pushing direction of the ten-key 22 (see direction "D").

Each of the keys 15 has a lighting indicator, such as an LED, in the top of the key or by the key. The lighting indicator is to indicate that the corresponding key 15 has been pushed to select the corresponding mode.

The operation panel 10 is capable of pivoting in a first direction "E" (see FIG. 4) along the vertical plane and also capable of pivoting in a second direction "F" (see FIG. 2) along the horizontal plane. A first support unit 40 which supports the operation panel 10 so as to pivot in the first direction "E" and a second support unit 60 which supports the operation panel 10 so as to pivot in the second direction "F" are hereinafter described.

First and Second Support Units; See FIGS. 6-12

As FIGS. 6-9 show, the first support unit 40 has a pivot shaft 44 inserted through a pipe 43 provided between fixed brackets 41 and 42. On both ends of the pivot shaft 44, movable brackets 45 and 46 are fitted in such a way to pivot in the first direction "E". The operation panel 10 is screwed onto protruding tabs 45a and 46a of the movable brackets 45 and 46.

A holder bracket 47 is fixed on the movable brackets 45 and 46, and a lock member 48 (see FIG. 11) with a lock claw 48a is fitted to the holder bracket 47 such that the lock member 48 is capable of pivoting on a pin 48b. An end of the lock member 48 is connected to a slide member 49 through a pin 48c. The slide member 49 is fitted to the holder bracket 47 such that a long hole 49a of the slide member 49 will be in engagement with a pin 47a of the holder bracket 47, so that the slide member 49 is capable of sliding in the direction "G". A tab 50 is fixed to the movable bracket 46, and a coil spring 51 is provided between the slide member 49 and the tab 50, so that the slide member 49 is forced to return to the rear by the coil spring 51. Further, at an end of the slide member 49, a handle 52 is fixed.

As FIGS. 6-9 show, in the meantime, three lock holes 41a, 41b and 41c are made in the fixed bracket 41, and one lock hole 45b is made in the movable bracket 45. The lock claw 48a pierces through one of the three lock holes 41a, 41b and 41c of the fixed bracket 41 and further pierces through the lock hole 45b of the movable bracket 45. In this way, the movable brackets 45 and 46 and accordingly the operation panel 10 can be locked at either one of three pivot angles.

Figure 11:
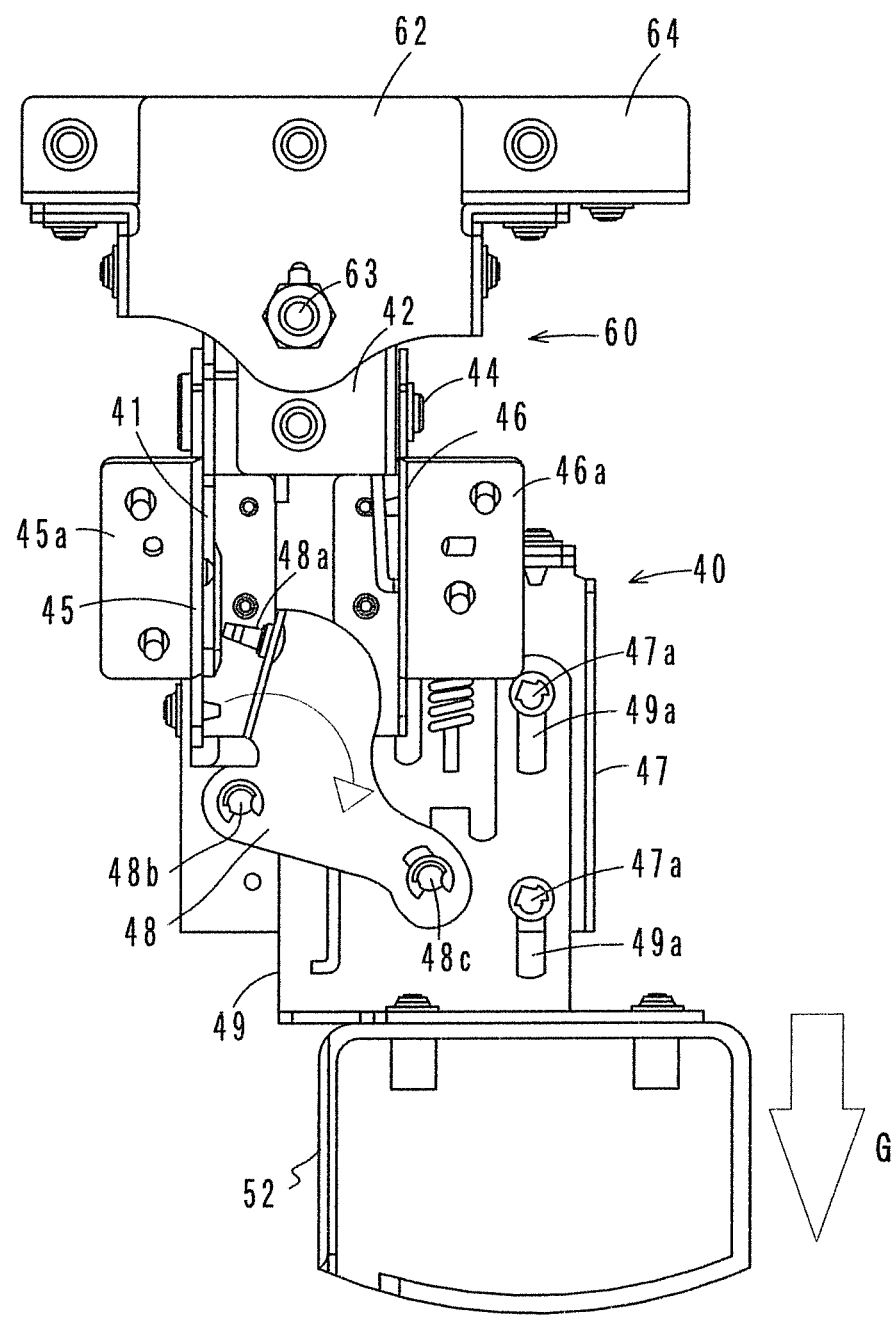
FIG. 11 is a plan view of the first and second support units when the first support unit comes to an unlocked position.

In the first support unit 40 of the above-described structure, a default position (see FIG. 7) of the operation panel 10 in the first direction "E" is a state where the lock claw 48a is piercing through the uppermost lock hole 41a of the fixed bracket 41. In this state, as FIG. 4 shows, the operation face of the second section 21 is set in a position to be at an angle of approximately 7 degrees to the horizontal plane "C". When an operator pulls the handle 52 forward (in the direction "G"), as FIG. 11 shows, the slide member 49 is also pulled forward together with the handle 52, and the lock member 48 pivots on the pin 48b clockwise. Thereby, the lock claw 48a comes out of engagement with the lock holes 41a, 41b and 41c, and the operation panel 10 becomes capable of pivoting in the first direction "E" freely.

In the unlocked state, as the handle 52 is being pushed down, the operation panel 10 pivots downward on the pivot shaft 44. Then, when the lock claw 48a is engaged with the lock hole 45b via the middle lock hole 41b, the operation panel 10 is locked in a middle level. Alternatively, when the lock claw 48a is engaged with the lock hole 45b via the lowermost lock hole 41c, the operation panel 10 is locked in a lowermost level (see FIG. 9). The lowermost locked position of the operation panel 10 is a position pivoted down at approximately 20 degrees to 30 degrees from the default position.

In locking the operation panel 10 in one of the three positions, when the operator stops pulling the handle 52, the slide member 49 slides back to the rear by the spring force of the coil spring 51. Meanwhile, the lock member 48 pivots on the pin 48b counterclockwise in FIG. 11, and the lock claw 48a comes into engagement with the lock hole 45b via one of the lock holes 41a, 41b and 41c.

Figure 6:
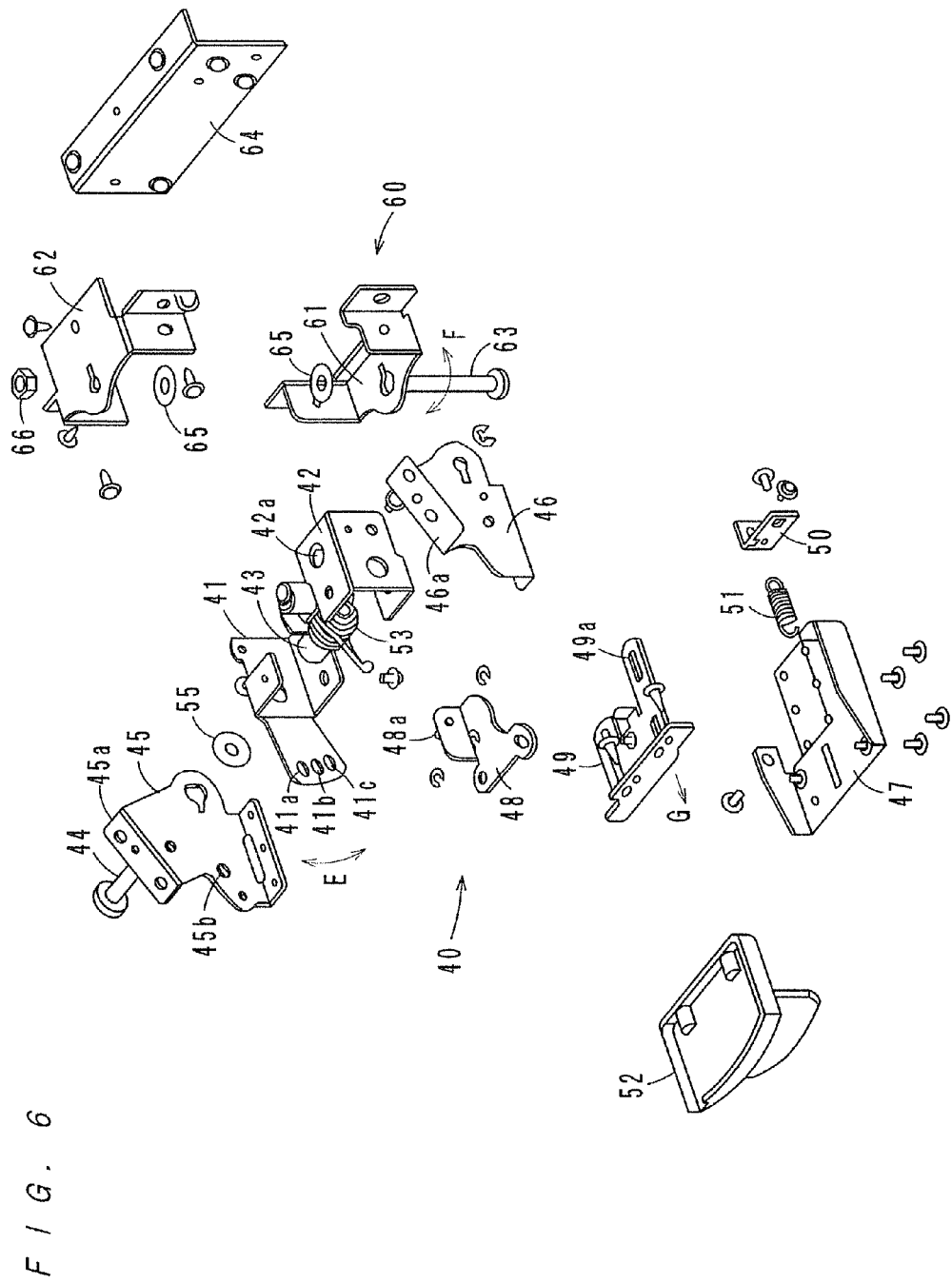
FIG. 6 is an exploded perspective view of a first support unit and a second support unit.
Figure 7:
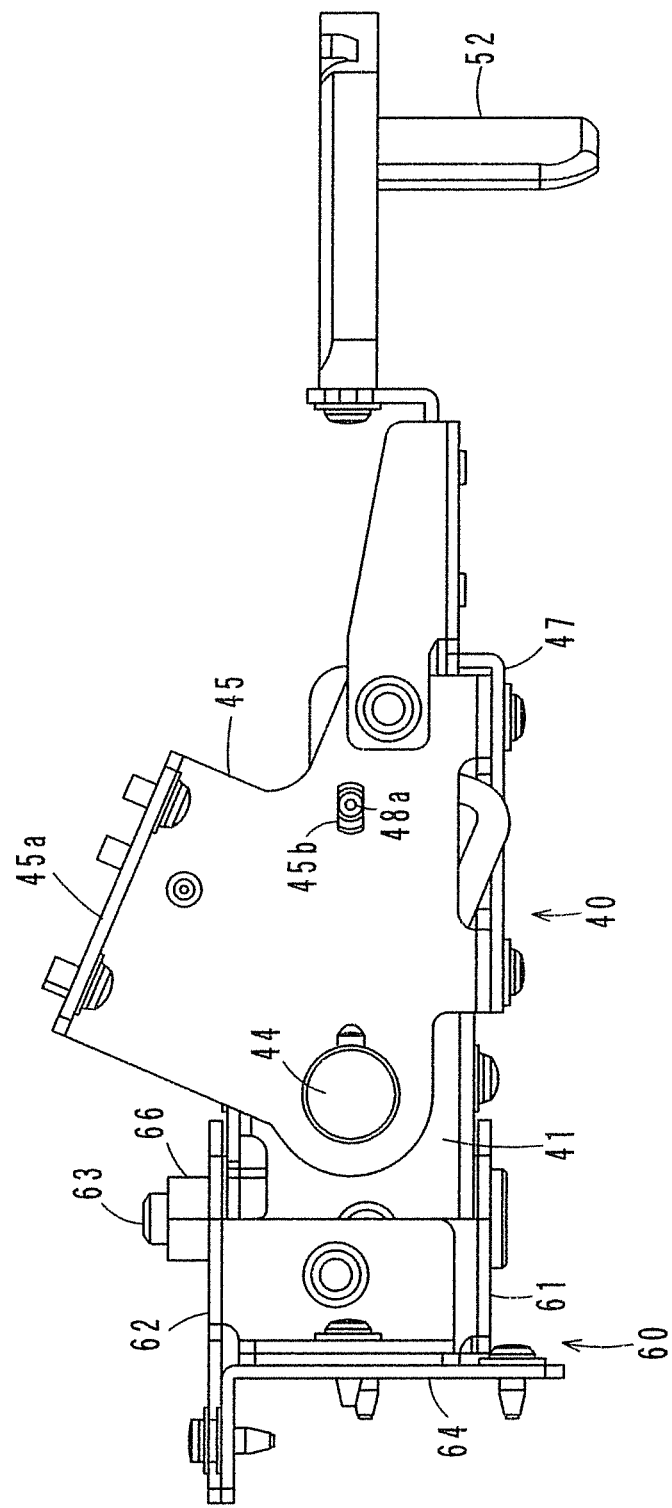
FIG. 7 is a side view of the first and second support units in their respective default positions.
Figure 8:
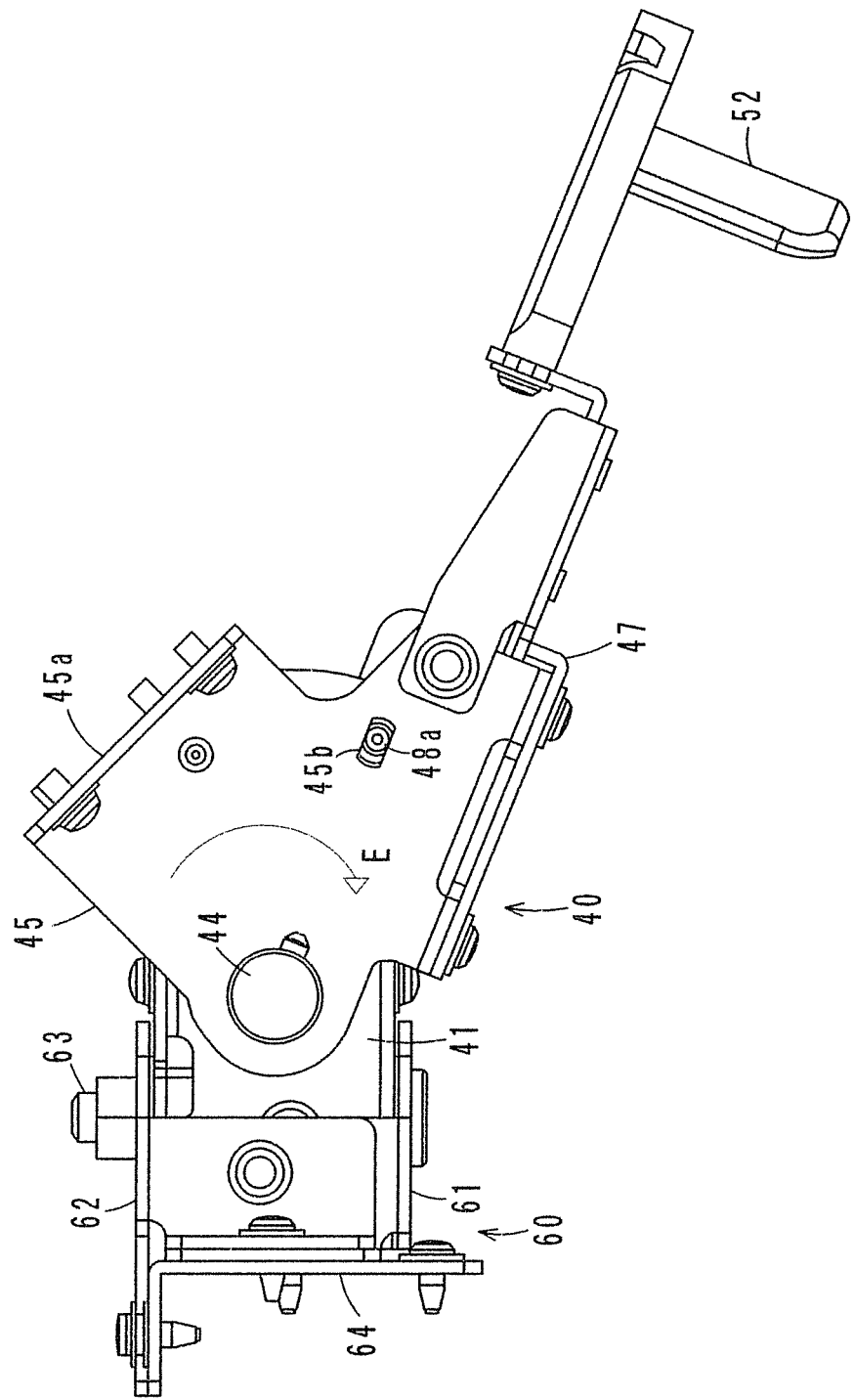
FIG. 8 is a side view of the first and second support units pivoting in a first direction.
Figure 9:
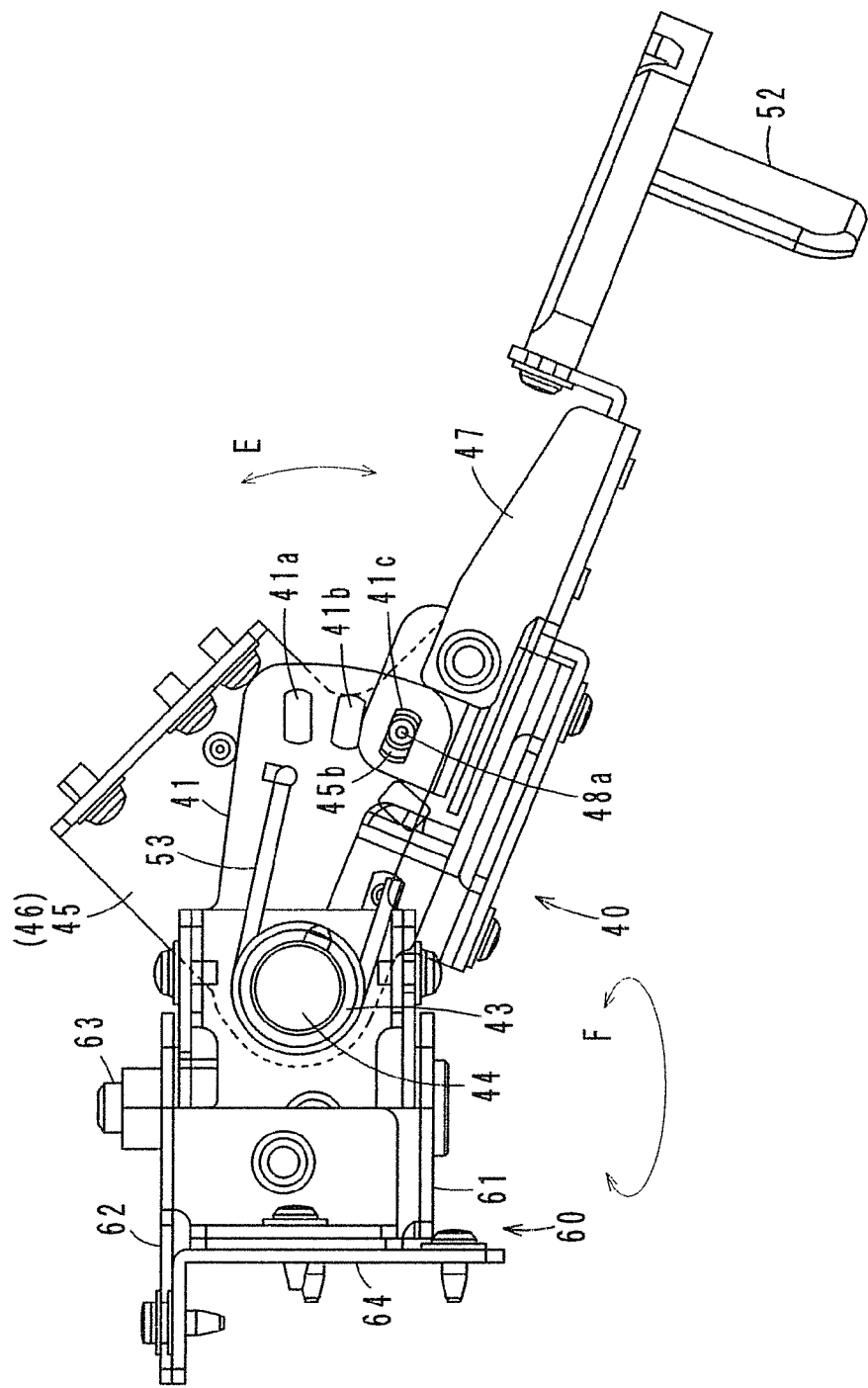
FIG. 9 is a sectional view of the first support unit which is locked in a locked position.

As FIGS. 6 and 9 show, a coil spring 53 is wound around the pipe 43. An end of the coil spring 53 is engaged with the fixed bracket 42, and the other end of the coil spring 53 is engaged with the movable bracket 46. While the operation panel 10 is pivoting downward, the spring force of the coil spring 53 acts as a resistance, which prevents the operation panel 10 from falling down. The coil spring 53 also lightens the load to pivot the operation panel 10 upward. Thus, the coil spring 53 functions as a balancer which supports the operation panel 10 against the gravity.

Next, the second support unit 60 which supports the operation panel 10 so as to pivot in the second direction "F" along the horizontal plane "C" is described.

As FIG. 6 shows, a pivot shaft 63 is vertically fixed to horizontal brackets 61 and 62, and the pivot shaft 63 pierces through a hole 42a of the bracket 42. Thereby, the bracket 42 is capable of pivoting on the shaft 63 in the horizontal plane. The horizontal brackets 61 and 62 are fixed on the front surface of the image reading unit 8 via the fixed bracket 64.

Washers 65 are provided between the bracket 41 and the horizontal bracket 61 and between the bracket 42 and the horizontal bracket 62. The washers 65 also apply a resistance to the pivot in the second direction "F". The surfaces of the washers 65 which are in contact with the brackets 41 and 42 are coated with a lubricant, for example, fluorine, very high density polyethylene or the like. The surfaces of the washers 65 which are in contact with the horizontal brackets 61 and 62 do not have any particular treatments or have a treatment with a braking effect such as a blast treatment.

Figure 12:
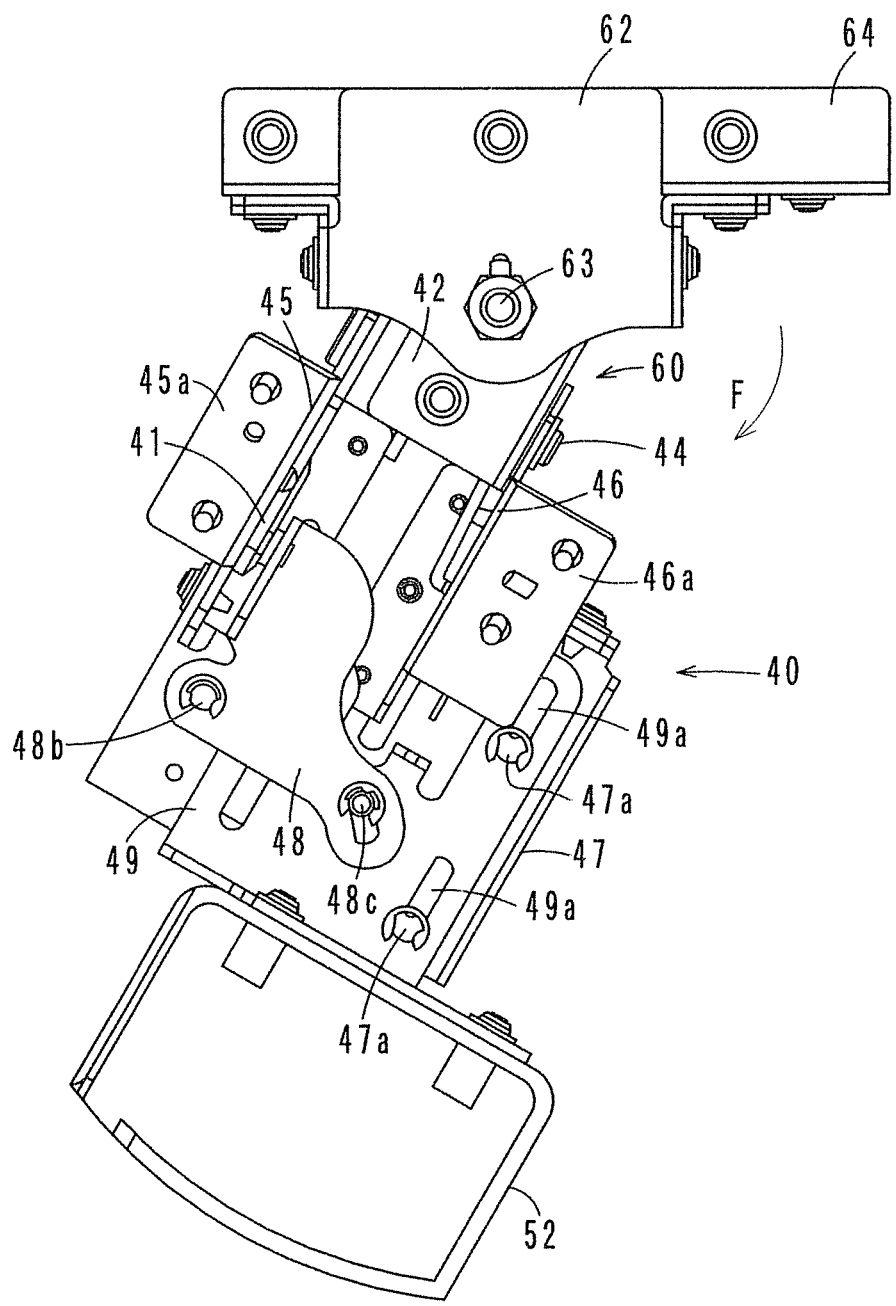
FIG. 12 is a plan view of the first and second support units when the second support unit is pivoting.

With the second support unit 60 of the above-described structure, when an operator pushes the operation panel 10 horizontally, the operation panel 10 pivots right and left on the pivot shaft 63 (see FIG. 12). At this moment, the washers 65 apply a moderate resistance to the pivot. The strength of the resistance applied by the washers 65 is adjustable by adjusting the pressure between the brackets 41 and 61 and the pressure between the brackets 42 and 62. More specifically, by adjusting clamping force of a nut 66 to the shaft 63, the resistance can be adjusted.

The default position of the operation panel 10 in the second direction "F" is a position where the lateral rows of keys of the ten-key 22 and the other keys are in parallel to the front surface of the copying machine body 2. The operation panel 10 is capable of pivoting from this default position toward an operator, that is, leftward within a range of approximately 25 degrees to 35 degrees (see FIG. 12), and the operation panel 10 can be set at an angle within this range.

Effect of the Support Units

With the above-described operation panel support structure having the first and second support units 40 and 60, the operation panel 10 is capable of pivoting in the vertical plane and in the horizontal plane. Therefore, an operator can set the first and second operation planes at desirable angles in accordance with his/her height and posture or in accordance with whether the operator is in a wheelchair, and thus, the operation panel 10 can comply with a demand for universal design.

Regarding the first direction "E", since the operation panel structure has a lock system which permits the operation panel 10 to be locked in one of a plural number of (three) optional positions, it will not take so long a time for an operator to decide the position of the operation panel 10. Also, even if the keys are handled roughly, the operation panel 10 sufficiently withstands pressure applied thereto in the gravitational direction, and there is no fear that the support unit 40 may become rickety and/or loose. Regarding the second direction "F", the washers 65 function as a brake member to apply a moderate resistance to a pivot, and thereby, the pivot in the horizontal direction can be well controlled, which is naturally difficult for human beings.

The first support unit 40 is fitted to the second support unit 60, and the pivot in the first direction "E" is independent of the pivot in the second direction "F". Accordingly, it is possible to pivot the operation panel 10 in the second direction "F" whether the operation panel 10 is locked in the first direction "E" or is unlocked in the first direction "E". Also, it is possible to pivot the operation panel 10 in the first direction "E" and in the second direction "F" simultaneously while the operation panel 10 is unlocked. Therefore, an operator can adjust the angle of the operation panel 10 freely.

The coil spring 53 functions as a balancer which supports the operation panel 10 against the gravity, and thereby, an upward pivot of the operation panel 10 is facilitated. According to the present invention, however, such a balancer is not inevitable and can be omitted. Instead of the balancer, as in the second support unit 60, a washer 55 (see FIG. 6) may function as a brake member to apply a moderate resistance to a pivot in the first direction "E". Also, as long as the lock system is provided, the brake member to a pivot in the first direction "E" is not inevitable and can be omitted.

Locations of the Pivot Shafts

Figure 2:
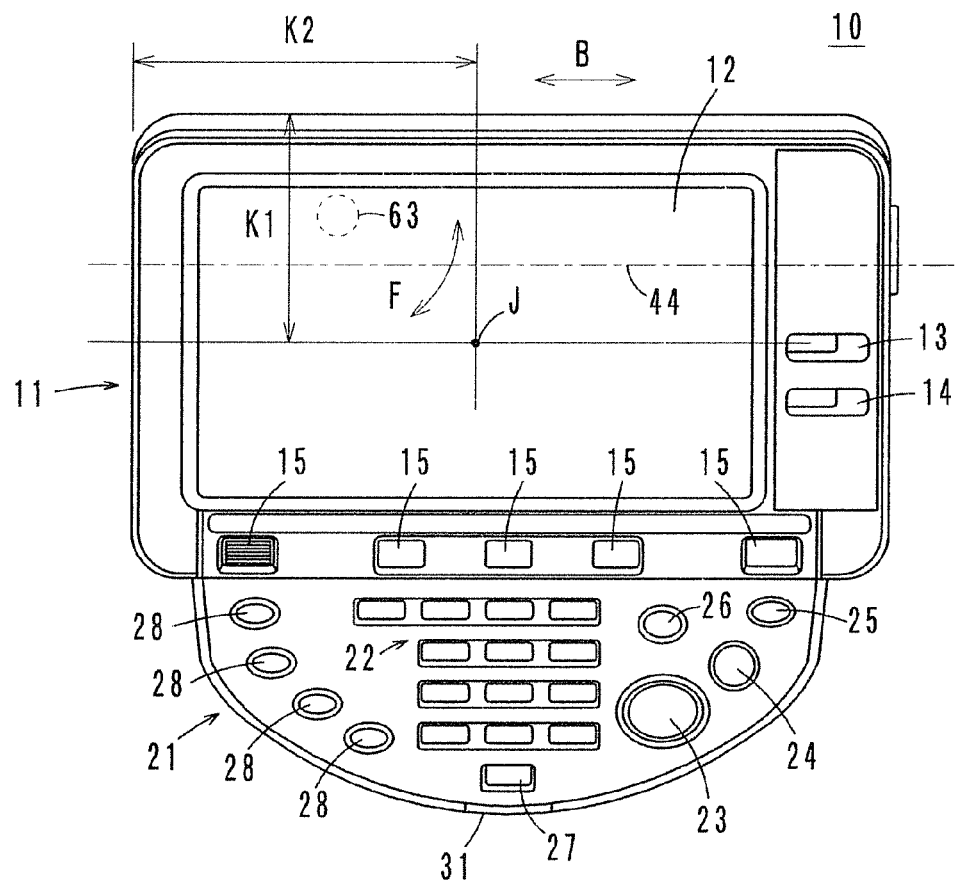
FIG. 2 is a plan view of an operation panel.
Figure 3:
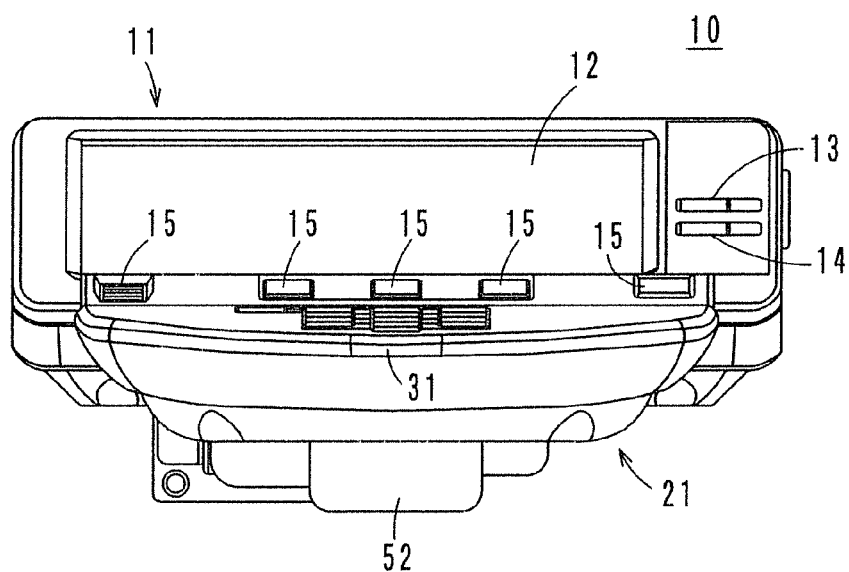
FIG. 3 is a front view of the operation panel.

The pivot shaft 44 of the first support unit 40 is located under the first section 11, in the rear from the center "J" of the first operation face (see FIG. 2). The pivot shaft 63 of the second support unit 60 is located under the first section 11, on the left side from the center "J" of the first operation face.

FIGS. 2 and 4 show a preferred example of locations of the pivot shafts 44 and 63. In the preferred example, the pivot shaft 44 is located substantially in the middle of the distance K1 between the center "J" and the rear edge of the first operation face, and the pivot shaft 63 is located distant from the center "J" by approximately one third of a distance K2 between the center "J" and the left edge of the first operation face.

Since the pivot shaft 44 of the first support unit 40 is located in the rear from the center "J" of the first operation face, while the operation panel 10 is pivoting in the first direction "E", there is no possibility that the rear side of the operation panel 10 may be lifted up unnecessarily and may interfere with a large-sized sheet sticking out of the document tray. Also, the forward protrusion of the operation panel 10 does not become so large, and there is no possibility that the protruding operation panel 10 may interfere with the operator.

Since the pivot shaft 63 of the second support unit is located in the left side from the center "J" of the first operation face, there is no possibility that the left side of the operation panel 10 may stick out leftward large and may interfere with an operator which usually stands in the left side of the copying machine body 2. Also, the operability of the copying machine 1 is not sacrificed.

The pivot shaft 44 of the first support unit 40 is located in front of the pivot shaft 63 of the second support unit 60, and thus, the first support unit 40 is supported by the second support unit 60. Therefore, the operation panel 10 pivots in the second direction "F" while the operation panel 10 is held at an angle in the first direction "E", and the position setting of the operation panel 10 is efficient. With this arrangement, also, the angular moment of the operation panel 10 by the gravity is small, and the operation panel 10 is sufficiently strong against downward pressure applied thereto by key inputs.

Structure of the Operation Panel and Effect of the Shape of the Operation Panel

In the operation panel 10, the first section 11 mainly functioning as a display and the second section 21 having the ten-key 22 and other keys are made integral with each other such that the respective operation faces of the first section 11 and the second section 21 are at a specified angle to each other in a direction perpendicular to the width direction of the copying machine body 2 and are at respective specified angles to the horizontal plane "C". Therefore, the visibility of the display is good, and the key operation is easy. The first section 11 is rectangular in a plan view, and the liquid crystal display 12 to display various kinds of information can be simply arranged. The second section 21 is substantially semicircular in a plan view, and protrusion of the second section 21 from the copying machine body 2 can be minimized. Therefore, the second section 21 appears compact and compatible and does not interfere with other parts and an operator. Further, the operation panel 10 is easy to access from every direction and can be recognized easily even by a weak-sighted person.

Because the front portion of the second section 21 is round in a plan view and because a moderate resistance to a pivot of the operation panel 10 in the horizontal direction "C" is applied, the position setting of the operation panel 10 is efficient. Also, the round front portion of the second section 21 minimizes an impact of interference with an operator and facilitates an access to the second section 21 from every direction.

Further, the front portion and the side portions of the second section 21 are round in the thickness direction (see the number 39 in FIG. 4). When an operator takes out a printed and ejected sheet, he/she may bend forward and may hit his/her head against the operation panel 10. Even in this case, because the second section 21 has a rounded-off corner 39, the impact on his/her head is weak.

On the operation face of the first section 11, the keys 15 which are seldom used are provided in front of the liquid crystal display 12, and these keys 15 are operated independently of the operation face of the second section 21 with keys which are often used, such as the ten-key 22. Thus, the operation panel 10 is easy to handle. Also, each of the seldom-used keys 15 which are provided on the operation face of the first section 11 has a round upper portion. These keys 15 protrude more than the ten-key 22, and the keys 15 are pushed in substantially the same direction as the pushing direction of the ten-key 22. Thus, the operation panel 10 is easy to handle.

Each of the keys 15 has a lighting indicator, such as an LED, in the top of the key or by the key. This enables an operator to recognize whether the mode corresponding to each of the keys 15 has been selected.

Modification of the Lock System; See FIGS. 13 and 14

Figure 10:
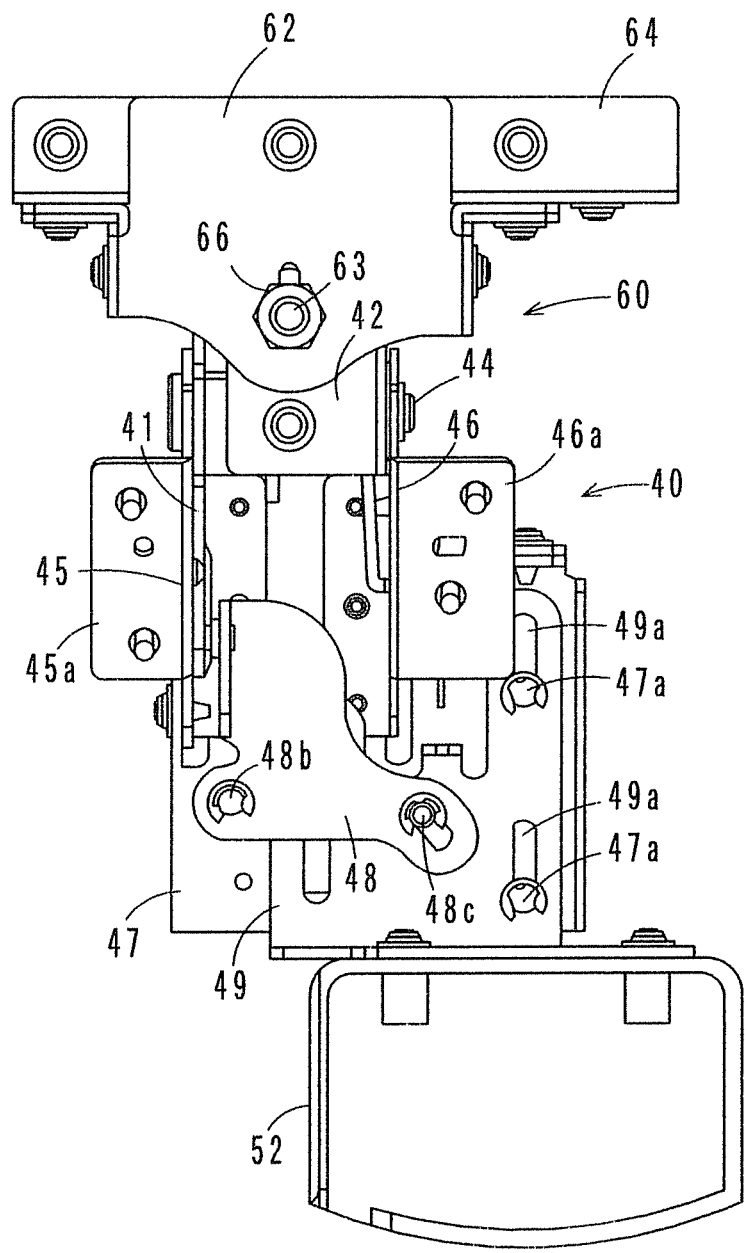
FIG. 10 is a plan view of the first and second support units.
Figure 13:
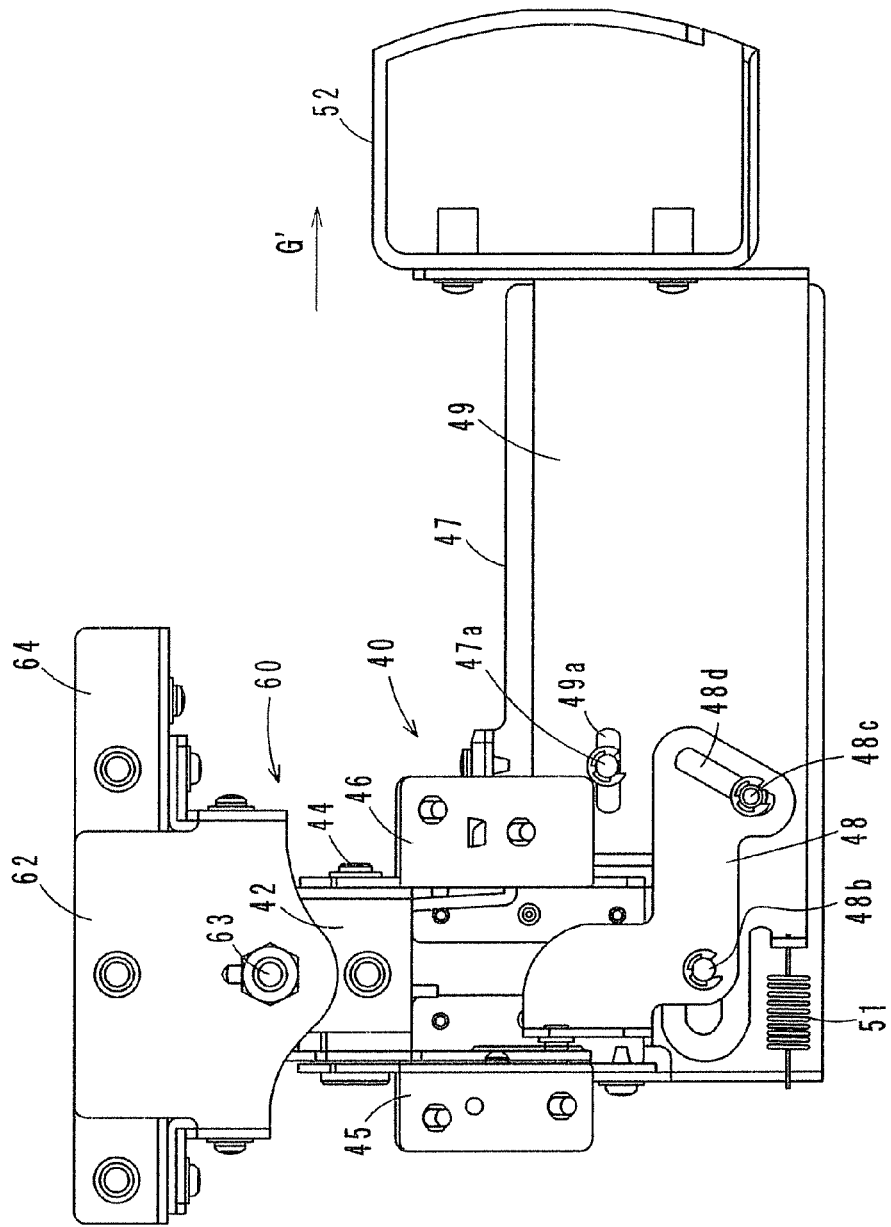
FIG. 13 is a plan view of the first and second support units with a modified lock system.
Figure 14:
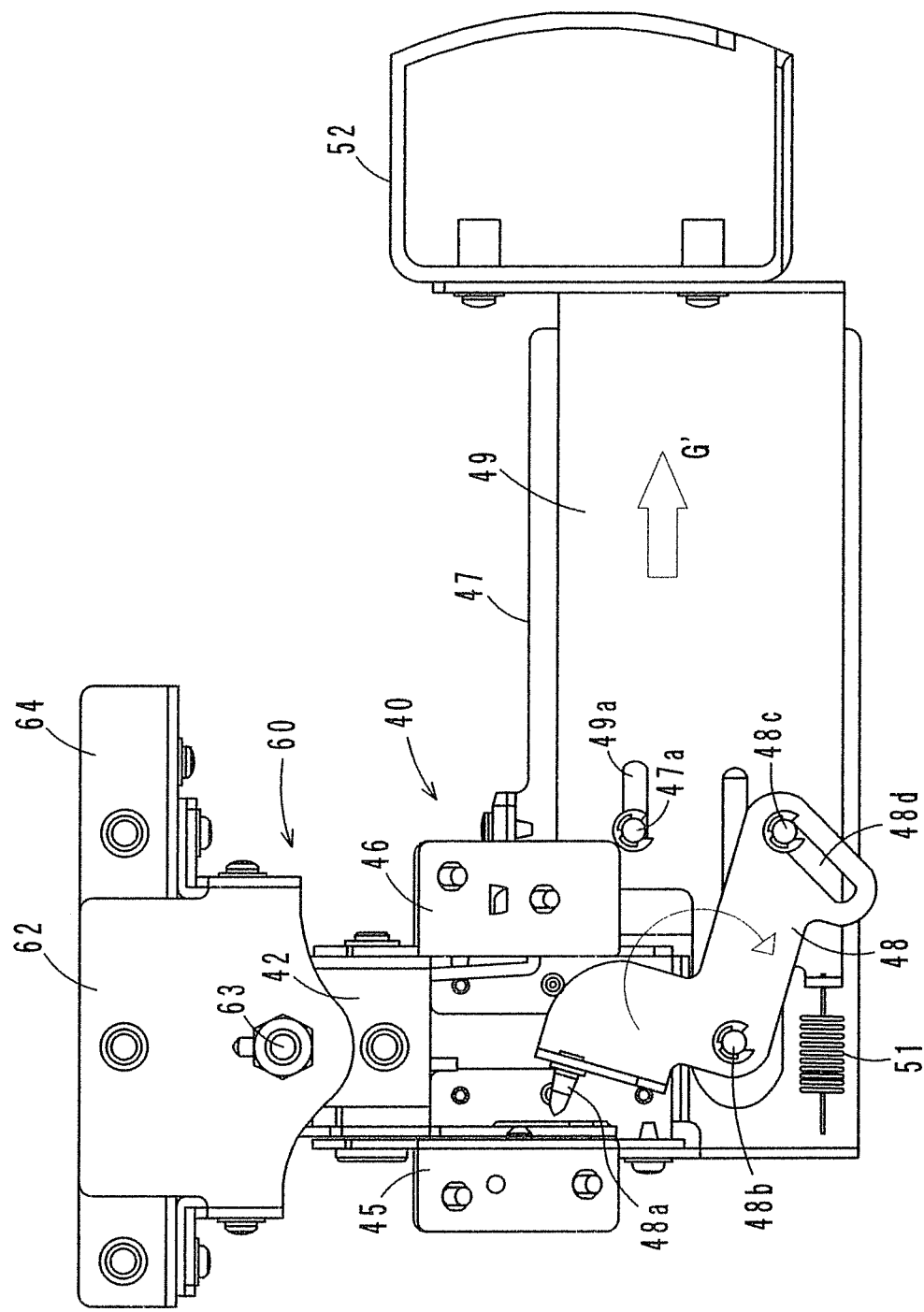
FIG. 14 is a plan view of the first and second support units with the modified lock system shown in FIG. 13 when the lock system is unlocked.

In the lock system described above, when an operator pulls the handle 52 located in front of the second section 21 of the operation panel 10, the system is unlocked. Then, the operator can pivot the operation panel 10 while grabbing the second section 21 and the handle 52. Thus, positioning of the operation panel 10 can be performed naturally. However, as a modification shown by FIGS. 13 and 14, the handle 52 may be located by the side of the second section 21. In FIGS. 13 and 14, the same parts and members, and the parts and members with the same functions as those in FIGS. 10-12 are provided with the same reference symbols.

In the modified lock system, when the handle 52 is moved in the direction "G'", the slide member 49 is moved in the direction "G'" also. Accordingly, the pin 48c is moved in the long hole 48d, and the lock member 48 pivots on the pin 48b clockwise. Thereby, the lock claw 48a is disengaged from the lock hole 41a, 41b or 41c (see FIG. 9).

EFFECTS OF THE INVENTION

In the operation panel structure according to the present invention, it is possible to pivot the operation panel in the first direction along the vertical direction and in the second direction along the horizontal direction, and thereby, it is possible to set an operation face of the operation panel in a good position to match with the height and the posture of an operator. Especially regarding the first direction, because of the lock system for permitting the operation panel to be held in a plural number of positions, the operator can set the operation panel in a desired position without being at a loss, and the support units can sufficiently withstand pressure in the gravitational direction and therefore does not become rickety and/or loose. Also, because the brake member applies a moderate resistance to a pivot of the operation panel in the second direction, the pivot in the horizontal direction, which is naturally difficult to handle for human beings, becomes easy.

In the operation panel structure, preferably, the first support unit is fitted to the second support unit, and a pivot of the operation panel in the first direction is independent of a pivot of the operation panel in the second direction.

In the point of operability of the operation panel structure, it is preferred that an operator pulls a lever so as to unlock the operation panel from the lock system. The lock system may be structured such that the lever comprises a lock claw for permitting a fixed member and a movable member to be engaged with each other and to be disengaged from each other and such that when an operator pulls the lever, the lock claw disengages the fixed member and the movable member from each other.

Further, the operation panel may be capable of pivoting in the second direction while being locked with respect to the first direction, or may be capable of pivoting in the second direction while being unlocked with respect to the first direction. Alternatively, the operation panel may be capable of pivoting in the first direction and the second direction simultaneously while being unlocked from the lock system.

The first support unit may comprise a balancer for supporting the operation panel in the first direction against gravity. The balancer will facilitate an upward pivot of the operation panel.

The brake member for applying a resistance to a pivot in the second direction may be provided in the second support unit. The brake member may comprise a lubricant and may be nipped between the fixed member and the movable member. In this case, the resistance can be adjusted by changing pressure between the fixed member and the movable member. The pressure can be changed by changing clamping force between a bolt and a nut.

Other Embodiments

The details of the first and second support units can be arbitrarily designed. Also, the first operation face and the second operation face may be arbitrarily designed. The operation panel structure according to the present invention may be applied to various image data input/output devices such as printers and scanners as well as copying machines.

Although the present invention has been described in connection with the preferred embodiments above, it is to be noted that various changes and modifications are possible to those who are skilled in the art. Such changes and modifications are to be understood as being within the present invention.

What is claimed is:

1. An operation panel structure for an image data input/output apparatus, comprising an operation panel with an operation section protruding from a front side of a body of the image data input/output apparatus, said operation panel structure comprising:
    a first support unit for supporting the operation panel such that the operation panel is capable of pivoting on a first pivot shaft in a first direction along a vertical direction;
    a second support unit for supporting the operation panel such that the operation panel is capable of pivoting on a second pivot shaft in a second direction along a horizontal direction, wherein the second pivot shaft extends in the vertical direction;
    a lock system for permitting the first support unit to be held in a plural number of locked positions while the operation panel is pivoting in the first direction;
    a brake member, which is provided for the second support unit, for applying an adjustable level of a frictional force to a pivot of the operation panel in the second direction;
    an unlock member for releasing the first support unit from the position locked by the lock system so as to permit the operation panel to pivot in the first direction;
    wherein the second support unit comprises a second support member for supporting a first support member that pivots in the second direction together with the operation panel and for holding the first support member in a position with respect to the second direction via the brake member;
    wherein a surface of the brake member that is in contact with the first support member is coated with a lubricant, and a surface of the brake member that is in contact with the second support member is not coated with a lubricant; and
    wherein the first pivot shaft extends along a first longitudinal axis and the second pivot shaft extends along a second longitudinal axis, the first longitudinal axis being offset from the second longitudinal axis so that the first longitudinal axis does not intersect the second longitudinal axis.

2. The operation panel structure according to claim 1, wherein:
    the first support unit is fitted to the second support unit; and
    a pivot of the operation panel in the first direction is independent of a pivot of the operation panel in the second direction.

3. The operation panel structure according to claim 1, wherein the unlock member comprises a lever which an operator pulls so as to unlock the operation panel, from the lock system.

4. The operation panel structure according to claim 3, wherein:
    the lever comprises a lock claw for permitting a fixed member and a movable member to be engaged with each other and to be disengaged from each other; and
    when an operator pulls the lever, the lock claw disengages the fixed member and the movable member from each other.

5. The operation panel structure according to claim 1, wherein the operation panel is capable of pivoting in the second direction while being locked with respect to the first direction.

6. The operation panel structure according to claim 1, wherein the operation panel is capable of pivoting in the second direction while being unlocked with respect to the second direction.

7. The operation panel structure according to claim 1, wherein the operation panel is capable of pivoting in the first direction and in the second direction simultaneously while being unlocked from the lock system.

8. The operation panel structure according to claim 1, wherein the first support unit comprises a balancer for supporting the operation panel in the first direction against gravity.

9. The operation panel structure according to claim 1, wherein the brake member for applying the frictional force to a pivot in the second direction is located in the second support unit and is nipped between a fixed member and a movable member, the brake member comprising a lubricant.

10. The operation panel structure according to claim 9, wherein strength of the frictional force applied by the brake member is adjusted by changing pressure between the fixed member and the movable member.

11. The operation panel structure according to claim 10, wherein the pressure between the fixed member and the movable member is changed by changing clamping force by a bolt and a nut.

12. The operation panel structure according to claim 1, wherein a user overcomes the frictional force by applying a force in a direction tangential to the pivot of the operation panel in the second direction.

13. The operation panel structure according to claim 1, wherein the brake member surface in contact with the first support member and the brake member surface in contact with the second support member are oppositely disposed end faces of the brake member.

14. The operation panel structure according to claim 1, wherein the brake member surface in contact with the first support member and the brake member surface in contact with the second support member face opposite directions.

15. The operation panel structure according to claim 1, wherein the brake member surface in contact with the first support member and the brake member surface in contact with the second support member are planar.

16. An operation panel structure for an image data input/output apparatus, comprising an operation panel with an operation section protruding from a front side of a body of the image data input/output apparatus, said operation panel structure comprising:

a first support unit for supporting the operation panel such that the operation panel is capable of pivoting on a first pivot shaft in a first direction along a vertical direction;

a second support unit for supporting the operation panel such that the operation panel is capable of pivoting on a second pivot shaft in a second direction along a horizontal direction, wherein the second pivot shaft extends in the vertical direction;

a lock system for permitting the first support unit to be held in a plural number of locked positions while the operation panel is pivoting in the first direction;

a brake member, which is provided for the second support unit, for applying an adjustable level of a frictional force to a pivot of the operation panel in the second direction;

an unlock member for releasing the first support unit from the position locked by the lock system so as to permit the operation panel to pivot in the first direction;

wherein the second support unit comprises a second support member for supporting a first support member that pivots in the second direction together with the operation panel and for holding the first support member in a position with respect to the second direction via the brake member;

wherein a surface of the brake member that is in contact with the first support member is coated with a lubricant, and a surface of the brake member that is in contact with the second support member is not coated with a lubricant; and a through hole in the brake member, wherein the second pivot shaft extends through the through hole.

17. The operation panel structure according to claim 16, wherein:

the first support unit is fitted to the second support unit; and a pivot of the operation panel in the first direction is independent of a pivot of the operation panel in the second direction.

18. The operation panel structure according to claim 16, wherein the unlock member comprises a lever which an operator pulls so as to unlock the operation panel, from the lock system.

19. The operation panel structure according to claim 18, wherein:

the lever comprises a lock claw for permitting a fixed member and a movable member to be engaged with each other and to be disengaged from each other; and when an operator pulls the lever, the lock claw disengages the fixed member and the movable member from each other.

20. The operation panel structure according to claim 16, wherein the operation panel is capable of pivoting in the second direction while being locked with respect to the first direction.

21. The operation panel structure according to claim 16, wherein the operation panel is capable of pivoting in the second direction while being unlocked with respect to the second direction.

22. The operation panel structure according to claim 16, wherein the operation panel is capable of pivoting in the first direction and in the second direction simultaneously while being unlocked from the lock system.

23. The operation panel structure according to claim 16, wherein the first support unit comprises a balancer for supporting the operation panel in the first direction against gravity.

24. The operation panel structure according to claim 16, wherein the brake member for applying the frictional force to a pivot in the second direction is located in the second support unit and is nipped between a fixed member and a movable member, the brake member comprising a lubricant.

25. The operation panel structure according to claim 24, wherein strength of the frictional force applied by the brake member is adjusted by changing pressure between the fixed member and the movable member.

26. The operation panel structure according to claim 25, wherein the pressure between the fixed member and the movable member is changed by changing clamping force by a bolt and a nut.

27. The operation panel structure according to claim 16, wherein a user overcomes the frictional force by applying a force in a direction tangential to the pivot of the operation panel in the second direction.

28. The operation panel structure according to claim 16, wherein the brake member surface in contact with the first support member and the brake member surface in contact with the second support member are oppositely disposed end faces of the brake member.

29. The operation panel structure according to claim 16, wherein the brake member surface in contact with the first support member and the brake member surface in contact with the second support member face opposite directions.

30. The operation panel structure according to claim 16, wherein the brake member surface in contact with the first support member and the brake member surface in contact with the second support member are planar.

\* \* \* \* \*